(12) United States Patent
Chiappone et al.

(10) Patent No.: US 11,863,509 B2
(45) Date of Patent: Jan. 2, 2024

(54) PUBLISH-SUBSCRIBE MESSAGE TRANSFORMATION

(71) Applicant: Amazon Technologies, Inc., Seattle, WA (US)

(72) Inventors: Christopher Russell Chiappone, Mercer Island, WA (US); Ganesh Viswanathan, Seattle, WA (US); Timothy Kellogg, Seattle, WA (US); Kyle Michael Roche, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/975,199

(22) Filed: Dec. 18, 2015

(65) Prior Publication Data

US 2017/0180289 A1  Jun. 22, 2017

(51) Int. Cl.
*H04L 51/063* (2022.01)
*H04L 67/561* (2022.01)
(Continued)

(52) U.S. Cl.
CPC ............ *H04L 51/222* (2022.05); *G06F 9/542* (2013.01); *G06Q 30/0601* (2013.01);
(Continued)

(58) Field of Classification Search
CPC ......... H04L 51/04; H04L 51/06; H04L 51/10; H04L 51/12; H04L 51/14; H04L 51/18;
(Continued)

(56) References Cited

U.S. PATENT DOCUMENTS 4,079,200 A * 3/1978 Meri ................... H04M 1/6515
379/80
6,405,266 B1   6/2002 Bass et al.
(Continued)

FOREIGN PATENT DOCUMENTS

EP          0 961 452      12/1999
WO     WO 03/043286        5/2003
(Continued)

OTHER PUBLICATIONS

PCT/US2016/066226; Amazon Technologies, Inc.; filed Dec. 12, 2016; International Search Report dated Feb. 20, 2017, 5 pages, Netherlands.

*Primary Examiner* — Kamal B Divecha
*Assistant Examiner* — Sandarva Khanal
(74) *Attorney, Agent, or Firm* — Davis Wright Tremaine LLP

(57) ABSTRACT

A publish-subscribe messaging method may include identifying a definition of a transformation rule for transforming a message received from a publisher. The message may be received from the publisher at a broker. The message may identify a topic and may include message data. A determination may be made as to whether the message is associated with a transformation rule for transforming the message. The method may further include transforming the message as defined by the transformation rule and sending the transformed message to a destination.

21 Claims, 9 Drawing Sheets

(51) Int. Cl.
  *H04L 67/562* (2022.01)
  *H04L 67/565* (2022.01)
  *H04L 51/222* (2022.01)
  *G06Q 30/0601* (2023.01)
  *H04L 51/06* (2022.01)
  *G06F 9/54* (2006.01)
  *H04L 51/214* (2022.01)
  *H04L 67/53* (2022.01)
  *H04L 67/50* (2022.01)

(52) U.S. Cl.
  CPC ............ *H04L 51/06* (2013.01); *H04L 51/063* (2013.01); *H04L 51/214* (2022.05); *H04L 67/53* (2022.05); *H04L 67/535* (2022.05); *H04L 67/561* (2022.05); *H04L 67/562* (2022.05); *H04L 67/565* (2022.05)

(58) Field of Classification Search
  CPC ..... H04L 51/20; H04L 51/32; H04L 63/0209; H04L 63/029; H04L 67/02; H04L 67/12; H04L 67/16; H04L 67/20; H04L 67/26; H04L 67/2804; H04L 67/2809; H04L 67/2823; G06F 9/542; G06F 9/546; G06F 9/547; G06F 17/3087; G06F 2209/543; G06F 2209/544; G06Q 30/0601; G08G 1/0116; G08G 1/012; G08G 1/0133; G08G 1/0141; G08G 1/096716; G08G 1/096741; G08G 1/096775
  See application file for complete search history.

(56) References Cited

U.S. PATENT DOCUMENTS

| | | | |
|---|---|---|---|
| 7,702,724 B1 | 4/2010 | Brydon et al. | |
| 8,468,135 B2* | 6/2013 | Constantinescu | G06F 11/1453 707/640 |
| 8,549,305 B2* | 10/2013 | Moskowitz | H04L 9/3263 713/176 |
| 9,009,230 B1* | 4/2015 | Matthieu | H04L 69/08 709/227 |
| 2002/0095385 A1* | 7/2002 | McAvoy | G06Q 30/0601 705/51 |
| 2002/0138582 A1* | 9/2002 | Chandra | G06Q 10/107 709/206 |
| 2003/0065726 A1* | 4/2003 | Wells | H04L 63/0209 709/206 |
| 2003/0120828 A1* | 6/2003 | Clark | G06F 16/258 719/319 |
| 2003/0236859 A1* | 12/2003 | Vaschillo | G06F 16/986 707/E17.118 |
| 2004/0044729 A1* | 3/2004 | Foerg | G06Q 30/06 709/246 |
| 2004/0172454 A1* | 9/2004 | Appelman | G06F 9/542 709/206 |
| 2005/0028156 A1* | 2/2005 | Hammond | G06F 16/9535 718/100 |
| 2006/0106840 A1* | 5/2006 | Rooney | H04L 67/55 |
| 2006/0167897 A1 | 7/2006 | Jones et al. | |
| 2006/0265689 A1* | 11/2006 | Kuznetsov | G06F 9/546 717/117 |
| 2007/0192083 A1* | 8/2007 | Ivanov | G06F 40/205 704/1 |
| 2007/0192325 A1* | 8/2007 | Morris | H04L 67/02 |
| 2008/0133337 A1* | 6/2008 | Fletcher | G06F 16/958 705/7.11 |
| 2008/0133925 A1* | 6/2008 | Abe | H04L 9/3247 713/176 |
| 2008/0141150 A1* | 6/2008 | Kalaboukis | G06F 3/04817 715/764 |
| 2008/0177880 A1* | 7/2008 | Ginis | H04L 67/1001 709/226 |
| 2008/0242323 A1* | 10/2008 | Nair | H04L 69/04 455/466 |
| 2009/0305729 A1* | 12/2009 | Bennett | G06F 40/58 704/8 |
| 2010/0042690 A1* | 2/2010 | Wall | G06Q 10/107 709/206 |
| 2012/0143977 A1* | 6/2012 | Miche | H04L 67/12 709/207 |
| 2012/0159637 A1* | 6/2012 | Dove | G06F 21/6254 726/26 |
| 2012/0233272 A1* | 9/2012 | Bedi | G06F 9/542 709/206 |
| 2013/0174031 A1* | 7/2013 | Constantinou | H04L 51/00 715/256 |
| 2013/0246376 A1* | 9/2013 | Padmanabhan | G06F 16/254 707/694 |
| 2014/0128994 A1* | 5/2014 | Hallman | H04L 12/2809 700/12 |
| 2014/0143358 A1* | 5/2014 | Beausoleil | H04L 51/06 709/206 |
| 2015/0199903 A1 | 7/2015 | Cuomo et al. | |
| 2015/0302529 A1* | 10/2015 | Jagannathan | G06Q 40/08 705/4 |
| 2017/0034087 A1* | 2/2017 | Borenstein | H04L 51/08 |
| 2017/0103113 A1* | 4/2017 | Greenblatt | G06F 40/221 |

FOREIGN PATENT DOCUMENTS

| | | | |
|---|---|---|---|
| WO | WO 2004/053752 | 6/2004 | |
| WO | WO-2014049378 A1 * | 4/2014 | ......... G06Q 30/0252 |
| WO | WO-2015161118 A1 * | 10/2015 | ............. G06Q 40/08 |

* cited by examiner

PUBLISH-SUBSCRIBE MESSAGE TRANSFORMATION

BACKGROUND

In computer-related technologies, publish-subscribe systems are typically a messaging model or messaging configuration where senders of messages, called publishers, send messages or publications to topics or message queues to be consumed by receivers, called subscribers. A publisher may be an entity that publishes messages, and a subscriber is an entity that subscribes to a topic or message queue and/or consumes the messages published by the publisher. A publisher may publish messages regardless of the number of subscribers, interests of subscribers, etc. Specifically, a publish-subscribe system may be a system where messages are published by publishers into classes or topics without knowledge of which subscribers, if any, there may be to receive the message(s).

Subscribers do not receive messages directly from publishers, but receive messages through an intermediate broker or another system that performs subscription matching. The broker identifies subscribers to send messages based on a subscription to a topic from the subscriber. Subscriptions may specify topics of interest, sources of messages of interest, types of messages, or content of interest, etc. A "topic" may be a character string that describes the nature of the data that is published in a publish/subscribe system. The broker matches the topic with a list of subscribers who have subscribed to that topic and delivers the message to each of those subscribers.

Any number of publishers may publish messages to a broker on any variety of topics (e.g. shipping, receiving, accounting, geolocation, maintenance, etc.). Subscribers may register for such topics via subscription requests received at the broker, and the broker manages the distribution of the messages. The broker receives the message from the publisher and may distribute the message to multiple subscribers via a topic associated with the message. With the accelerating adoption of networked service provider environments (e.g., "cloud" computing) around the world, organizations are increasingly seeking ways to manage large amounts of data which may be produced by devices and may be published as messages to subscriber devices.

DETAILED DESCRIPTION

Figure 1A:
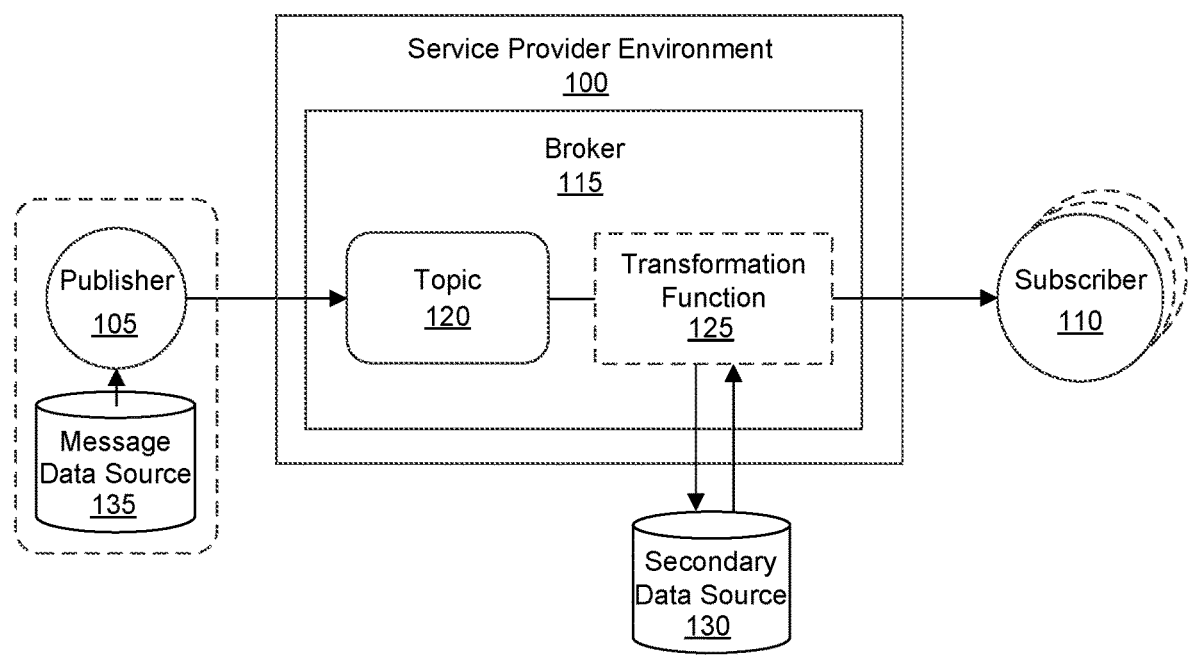
FIGS. 1a-1C are schematic overviews of systems for transforming publish-subscribe messages in accordance with an example of the present technology.

A technology for publish-subscribe message transformations is provided. In one example, a publish-subscribe messaging method may include receiving a definition of a transformation rule for transforming a message received from a publisher. A transformation rule may be a transformation function or may be a filter to filter messages for transformation using a transformation function based on predefined criteria. Transformation functions may query information, correlate data, combine data, etc. substantially in real time to add value to the data from the publisher. For example, the message data may be combined or correlated with other streaming or static data and/or may be used to derive additional data using the transformation function. The message may be received from the publisher at a broker. The message may identify a topic and may include message data. A determination may be made as to whether the message is associated with a transformation rule for transforming the message. The message may be associated with a transformation rule when the message content, a message source, a message flag or any other portion of the message satisfies criteria for transformation defined by the transformation rule. The method may further include transforming the message as defined by the transformation rule and publishing the transformed message to a destination, such as a subscriber subscribing to the topic or to any other suitable destination. In examples where the transformation rule is not the transformation function, the transformation rule may be used to filter messages for execution of the transformation function or to identify inline functions in the messages, etc. Transforming the message as defined by the transformation rule in such examples may include determining that the message includes one or more predefined criteria, identifying a transformation function to execute when the one or more predefined criteria are included in the message, and executing the transformation function on the message. A broker service may receive the message, filter the message, transform the message, etc. before transmitting to the destination.

In another example, a publish-subscribe messaging method may include receiving a definition of a transformation rule configured for transforming a message from a publisher. In addition, a message may be received from the publisher at a broker. The message may identify a topic and include message data. A determination may be made as to whether the message is associated with a transformation rule for transforming the message data of the message. For example, a message associated with predefined criteria defined in the transformation rule may be transformed using a transformation function at the broker. In one example, secondary data may be retrieved from a secondary data source as defined by the transformation rule. The function may be used to transform the message by combining the secondary data with the message data and generate a transformed message. The transformed message may be published to message destination. The transformed message may be sent (i.e., published) across a computer network, such as the internet or a local virtual network, to the destination (e.g., subscriber).

The present technology enables identifying the type of message or message content and indicates to the broker that sends messages to the subscriber that the message data is to be transformed before transmission to subscribers. Immediate (e.g., at least near real time or recent-time) message transformations may be applied to virtually any type of data or message. For example, a subscriber may desire to know the geo-location of an important asset (e.g., a vehicle or commercial truck) as the asset moves, and supplement that geo-location with information about the geo-location as a function of time (e.g., looking at past or predicted geo-locations), weather, and correlated with an identification of a person associated with the asset (e.g., a truck driver).

The present technology may be provided using a service provider environment. For example, the service provider environment may provide one or more services to host data published by publishers and/or any other data desired to be hosted. The service provider environment may enable customers or subscribers to initiate services on demand to perform any of a variety of functions on data in messages published by a publisher to transform the messages into transformed messages having increased value to subscribers. When a service is initiated on demand, underlying resources associated with the service may be initiated, such as to accommodate processing, storage, networking or other demands for the service. In one example, the service may be represented by one or more transformation functions to be applied to the messages. The service provider environment may provide a marketplace to enable the purchasing of sharing and hosting of data for subscribers, publishers, etc. The service provider environment may provide a marketplace to enable subscribers and publishers to purchase compute time to enable the execution of functions on the data. The service provider environment may provide a marketplace to enable to purchase of transformation rules and/or functions.

FIG. 1A illustrates an example system for transforming message data in a publication-subscription type of system. The system includes a publisher 105, a broker 115, and one or more subscribers 110. The publisher 105 may publish messages to the broker 115 and the broker 115 may transmit the messages to one or more subscribers 110, such as those who have subscribed to the messages from the publisher 105 or the topic 120 identified in the message published by the publisher 105. In some examples, a topic 120 may identify a subject or group of subjects or may identify a publisher 105 or group of publishers. Further, a topic may be a specific type of data stream that is not necessarily human readable but is readable by machines which consume published information.

The present technology may be utilized in a topic-based system, where messages are published to "topics" or named logical channels or message queues. Subscribers in a topic-based system may receive messages published to the topics to which the subscribers are subscribed, and each subscriber to a topic will receive the same messages. The publisher may be responsible for defining the classes of messages or topics to which subscribers may subscribe. The present technology may be utilized in a content-based system where messages are delivered to a subscriber if the attributes or content of those messages matches or is associated with constraints defined by the subscriber. The subscriber may be responsible for classifying the messages. The present technology may be utilized in a hybrid system where publishers post messages to a topic while subscribers register content-based subscriptions to one or more topics.

The broker 115 may use a queue for distributing the messages to the subscribers 110 and ensuring that each subscriber 110 receives a copy of the message. The order in which individual subscribers 110 receive the message relative to other subscribers 110 may be in any suitable order. In other words, the method of queuing transmission of the messages to the subscribers 110 is not particularly limited. In one example, the subscribers 110 may be queued in alphabetical order. In another example, the subscribers 110 may be queued according to an age of the subscription. In another example, the subscribers 110 may be queued according to geographical region or according to proximity to the broker 115. Various other examples are also contemplated which will be apparent to one of skill in the art. In addition, while a queuing type of system is described here, other types of message receiving systems may be used. For example, the messages may be received into a message bus type of system for distribution.

When the broker 115 receives a message for a topic 120, the broker 115 may queue publication of the message to the subscribers 110. The messages may include a tuple defining, for example, one or more of message data, sender data (e.g., an identifier, address, name or the like), a broker address, a topic (which may optionally be included in the message data), a transform flag (or flag state) indicating whether to transform the message data, and/or an inline function defining how to transform the data. When a message reaches the front of the queue, the broker 115 may transform the message using a transformation function (e.g., the inline function, or a transformation function referenced by a transformation rule corresponding to one or more contents of the message). For example, the broker 115 may replace at least a portion of the message data or combine the message data with secondary data from a secondary data source or manipulate the data as defined by the function, etc. to create a transformed message. The transformed message may then be transmitted to the subscribers 110. When a flag is not set and/or the message is not associated with a transformation rule, the message may not be transformed and may be published to the subscribers 110 as received from the publisher 105 without transformation.

In the example of FIG. 1A, the secondary data source 130 may be external to the broker 115. The publisher 105 may have or include a message data source 135, which may be a primary data source used to provide the message data in the message published to the broker 115. In one example, the broker 115 may send a request over a network, such as a local network, a virtualized network on a hardware substrate network, or the internet, for the secondary data at secondary data source 130 and may receive the secondary data in response. The broker 115 system or components may be a server or a service (which may optionally comprise a plurality of servers or other components) hosted in a service provider environment 100. The secondary data source 130 may optionally also be hosted in the service provider environment 100 separately from the broker 115. Alternatively, the secondary data source 130 may be external to the service provider environment and may optionally be geographically remote from where the service provider environment is executed.

In some examples, the message data may be generated by a human operator at the publisher. In other examples, the data source may be a device having a transducer, sensor, or other data generating device for capturing, generating or creating the message data. The message data source 135 may, in various examples, generate updated message data periodically and trigger the sending of messages in response to updated data. The triggering of the messages may occur upon request from the publisher, upon request from the broker, continuously in a stream, at random intervals, upon occurrence of defined events, etc. The message data may include one or more data types such as images at a publisher location, a geolocation of a moving publisher, environmental temperature at the publisher, internal temperature of the publisher, state of a publisher, or the like. The type of data to be updated in the message may be any of a wide variety of other types of data or combinations of data. In one example (FIG. 1B), the message data may be obtained by the publisher 105 from another source, such as a third party. The message data may optionally be transformed by combining the message data with secondary data from another publisher. The other publisher may publish messages to the broker 115 and the broker 115 may execute a transformation 127 on the message from the publisher 105 using a transformation function from a transformation function data store 160 to combine the message data from publisher 105 with the secondary data from the other publisher, represented as secondary data source 130. The transformation function data store 160 may store multiple available transformation functions which may be called when appropriate for the message, as may be determined using transformation rules.

Figure 1B:
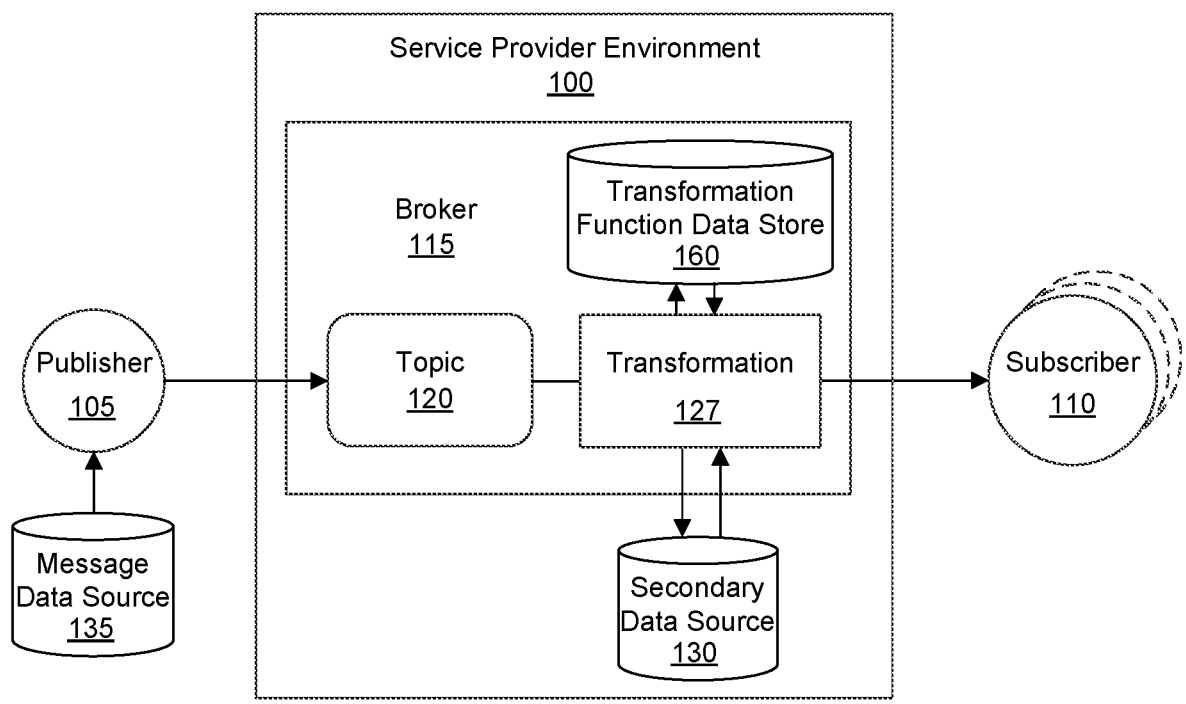

The system of FIG. 1B may provide a generic interface for plug-in datasets. In other words, any data source, such as secondary data source 130, may be connected to the service provider environment to allow the data to be used in transformations of other data from a publisher 105. The secondary data source 130 may be a static data source, a streaming data source or any other suitable type of data source. The broker 115 may be configured to initiate a service provider service on-demand, including for example initiating servers, processors, memory, networking or other resources for use in executing transformation functions 125 (FIG. 1A) on datasets.

Figure 1C:
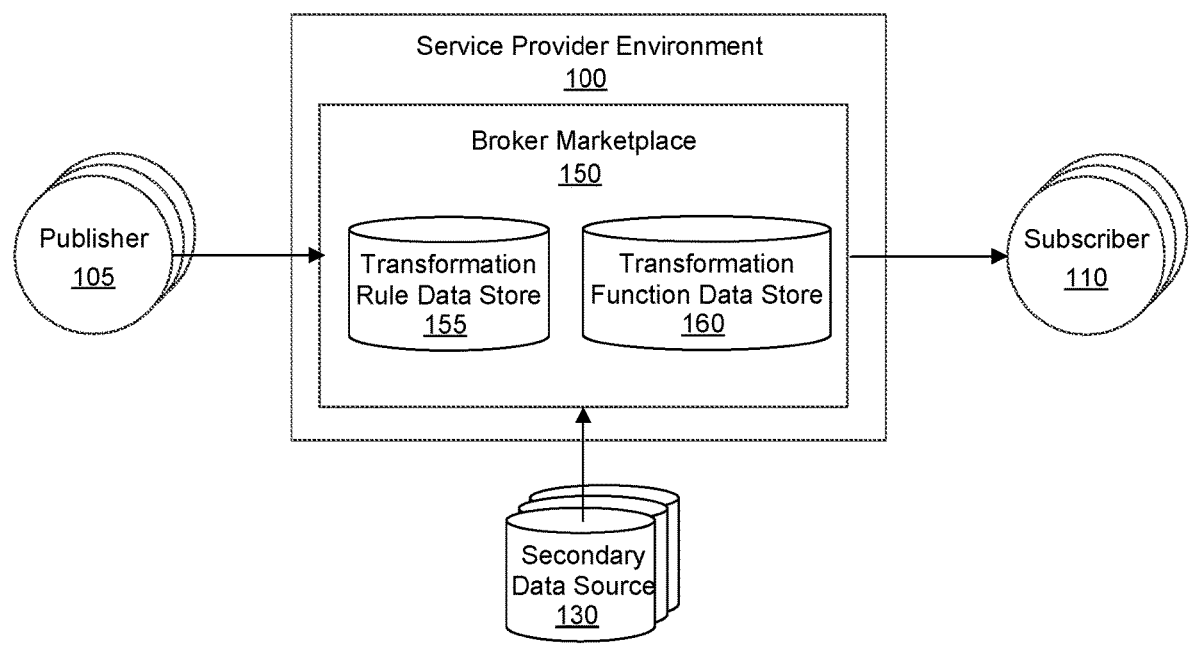

As an example use of the systems of FIGS. 1A-1C, a customer may provide a dictionary dataset as secondary data source 130 for use in the service provider environment 100. The dictionary dataset may be a dictionary for translating commands, scripts, data, etc. from one format, protocol, language or the like to another. Specifically in the context of IoT (Internet of Things) devices, the dictionary dataset may enable IoT devices to communicate with one another even when the IoT devices have disparate manufacturers, communicate using different protocols, etc. The service provider may execute underlying services to host the dictionary dataset and run APIs (Application Programming Interfaces) to access the dataset. Customers may call translation APIs from other services or can run translations when messages are sent from one device to another. For example, a customer with a smart home appliance and a smart phone may wish to control the appliance using the phone. The phone may be the publisher 105 and may publish a message with control instructions for controlling the appliance. The appliance may be a subscriber 110 and may subscribe to a topic 120 of messages from the publisher 105 for controlling the subscriber 110. The message may include the translation API call. When the message arrives at the broker 115 in the service provider environment 100, the broker 115 may execute the transformation function 125 based on the translation API call to translate the command from the phone into a format that is usable/understandable by the appliance using the dictionary dataset.

The present technology may provide a data marketplace (e.g., Broker Marketplace 150) as shown in FIG. 1C and an interface for customers to plug-in new datasets (e.g., secondary data sources 130), as well as define user-defined functions (UDFs) or transformation functions (in transformation function data store 160) and/or transformation rules (in transformation rule data store 155) to start building and executing service provider services running the functions on demand. The technology may provide extensible pay-per-use functionality of the rule sets that contain IoT rules. For example, a customer, a product manufacturer or the like may pay a fee each time a transformation function is executed, or each time a message is transformed (potentially using multiple transformation functions), or based on a size of message, or based on another data source accessed to perform the transformation, etc.

The present technology may utilize a client/server or virtualized network architecture that involves client computers connecting through a server with other client computers. Such a configuration may facilitate message brokering, subscription to topics, transformation of published messages with secondary data and so forth. An example of the client/server architecture or virtualized network of the present technology provides a central data center having at least one server provided therein.

In one example, the systems of FIGS. 1A-1C may be used to facilitate autonomous driving technologies. For example, cars, street lights, traffic cameras and the like may be IoT publishers and/or subscribers. In one example, a camera on a car may be a publisher and a navigation device for the car may be a subscriber, where the publisher publishes images from the car, such as may depict what is seen by the car. A transformation function may analyze the images using machine recognition technology to identify that there is currently a pedestrian in a crosswalk and may correlate this identification with safe maneuvering rules to send back to the navigation device so that the car can navigate safely in the vicinity of the crosswalk and avoid an impact with the pedestrian.

As another example, geolocation or other data of vehicles in a fleet may be published to a fleet manager for managing locations or other data from the vehicles. Drivers of the vehicles may carry a mobile device associated with the driver and which is trackable by the fleet manager. The broker 115 may receive location data from the vehicle and may execute a transformation function to correlate the location with the closest tracked mobile device to determine which mobile device is likely at a particular vehicle. Another secondary data store may be a dataset associating mobile devices with drivers. A transformation function may identify a driver from the mobile device in the same position as the vehicle and transmit to the fleet manager the location of the vehicle together with the name of the driver of the vehicle.

As another example, the geolocation of cars in a fleet may be published to a subscriber fleet manager to identify a present location of cars in the fleet. A secondary data store may define a geofence. The transformation function may compare the car location with the geofence to determine whether the car is inside or outside of the geofence. If the car is outside of the geofence, a second transformation function may be executed to provide a notification to the fleet manager or to the driver, or to remotely disable the car or perform any other desired function.

As another example, a coffee maker may be a subscriber of time and other instructional data and may subscribe to publications of time and operation instructions. A smart device hub may be a publisher that publishes the time and the operation instructions. The smart device hub may instruct the coffee maker to make coffee at a set time each day. The broker 115 may use transformation rules to intercept instructions to make the coffee while simply passing through the messages including the time. If a person who has requested the coffee is not at home, then the transformation function may transform the coffee making instruction to delay or cancel making coffee. For example, a geolocation of a mobile device of the person may provide secondary data which is used by the broker 115 to determine whether to make the coffee. In examples where the coffee making instructions are to begin making coffee at a future time, the coffee maker may relay on the time publications to substantially accurately make the coffee on time, particularly if the coffee maker lacks an internal clock or has an inaccurate clock. Depending on a frequency of publication of the time or a frequency of receipt of the publication, the coffee maker may use delay loops or the like based on an actual time received prior to the instructed coffee making time in order to turn on at approximately the correct time.

Figure 2:
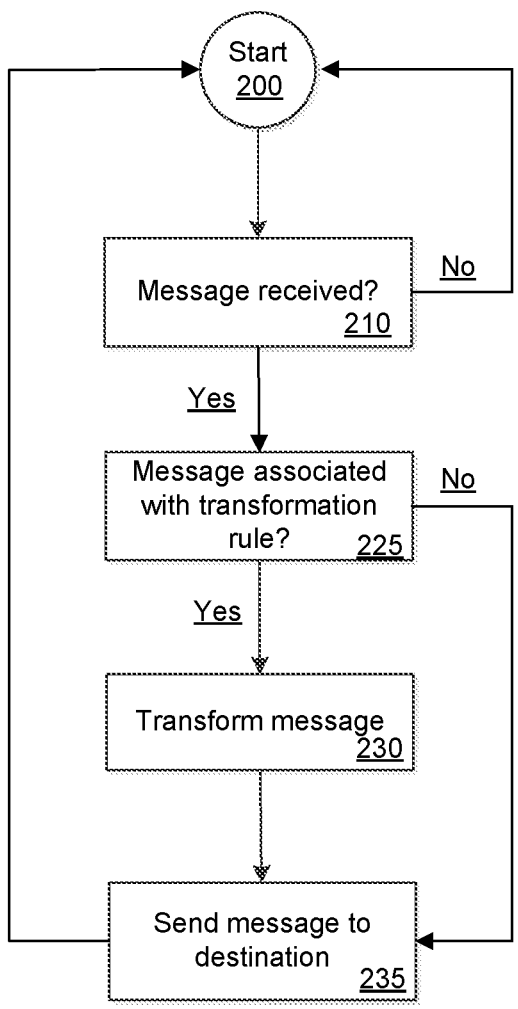
FIG. 2 is a flow chart illustrating a process for transforming publish-subscribe messages in accordance with an example of the present technology.

Referring now to FIG. 2, a process for transforming message data is illustrated as a simple decision tree or flow diagram. After a start 200 of the process, receipt of a message from a publisher may be detected 210. If no message has been received ('no' at 210), then the process may return to the start 200 and wait for a message to be received. If a message has been received ('yes' at 210), then a determination may be made at 225 as to whether the message is associated with a transformation rule. For example, a transformation rule identify message criteria such as a publisher identity, a specified topic, a check for whether a transformation flag is set, a check for an inline function in the message, or any other criteria useful in determining whether to perform the transformation and/or which transformation(s) to perform. If the message is associated with, corresponds to or at least partially matches the criteria of the transformation rule ('yes' at 225), a broker or transformation service may execute one or more transformation functions on the message based on the transformation rule or the contents of the message to transform the message at 230. After transforming the message, the message may be sent to a destination 235. If the message is not associated with a transformation rule ('no' at 225), the message may be sent to the destination at 235 without transformation. After a message is sent to the destination, the process may start again at waiting for a message.

The destination to which the message is sent may be a subscriber, an interested party, or may be a different destination. For example, the transformed message may be stored in a data store for persistence and may be accessible by interested parties. In another example, the destination may be the publisher. In another example, the destination may be the broker. Specifically, the message may be published from the broker back to the broker to determine whether additional transformations are to be performed, whether the transformed message is associated with a topic, etc., similarly as when an initial or original publication of a message is received.

As described with respect to FIGS. 1A-1C, the transformation of the message at 230 may include pulling data from different sources, such as data streams, static data or the like. The broker has the ability to funnel transformed data to different endpoints (i.e., different subscribers). Any number of subscribers may subscribe to any number of topics or publishers. Publishers may be represented by disparate devices providing data and the published data may be sent to other types of devices, services, or the like. Transformation functions may query information, correlate data, combine data, etc. substantially in real time to add value to the data from the publishers.

The transformation of the data may occur as the data streams in from a publisher and before transmission to subscribers. For example, using a vehicle mapping example, with connected vehicles and devices, etc. managed by a fleet manager, data may be received from the vehicles. The vehicles may periodically or upon occurrence of events (e.g., movement of the vehicle) transmit latitude and longitude coordinates to the broker. A transformation rule may specify that vehicle data including the coordinates for the identified fleet is to have a transformation function performed thereon. The transformation function may perform a reverse geocoding function by pulling the location data out of the message and referencing a different dataset for map-matching, finding a closest street to the vehicle, etc. in real time. Geospatial data may be a secondary data store which is accessed and used by the transformation function to transform the publication data to something useful for the fleet manager to track drivers, set up geofencing, route vehicles from a current location to desired location, avoid traffic congestion, etc. The message data may be further transformed through combination or correlation with data from other devices in the field or from third parties, such as to correlate with weather and compare with speed limit data and combine with data from other fleets, etc. The transformation rules may use a Structured Query Language (SQL) syntax to receive streaming data, execute a transformation rule to determine whether to further process and transform the data, and to execute a transformation function based on values of the data (e.g., JSON (JavaScript Object Notation) values).

IoT devices may be publishers constantly streaming messages or publishing data. The data may include a suitable type or class of data such as may be generated by IoT devices or sensors, for example, and may optionally be structured for particular use cases. If a first customer defines a transformation rule to identify geospatial streaming data, such a rule may be used to filter geospatial data for performing a transformation function. A second customer may create a second rule or extend the first rule, such as to transform the streaming data by integrating weather data or any other type of data from a secondary data source.

The service provider may provide one service for each customer (i.e., one-to-one) or one service for all customers (i.e., one-to-many). The service provider may integrate any query desired by a customer as the transformation rule. If data is received which meets the transformation rule criteria, a transformation function may be executed to query data out of a different data source. As an example, a vehicle sending a message may include a computer. The vehicle computer may have no relationship to the driver. Further, the vehicle may not have a relationship to the vehicle computer carried by the vehicle. A company that owns the vehicle can use data to identify the driver by querying a secondary data store to determine who the driver is. A third data store may be accessed to identify which vehicle corresponds to the vehicle computer. A transformation function may put data from these different sources together and output the result to another data store. A second transformation rule may collect temperature, speed, weather or other data and further combine this with the result of the previous function. Speed and temperature data may be included in a message payload from the vehicle and the weather data may be retrieved separately from an external or third-party data store.

The messages may include inline functions, such as to retrieve weather data. Alternatively, receipt of the message may trigger execution of the function based on the transformation rules. For example, a customer may define a transformation rule which specifies message contents of a web service call (a message) published from the publisher and a transformation function. The transformation function may define a location of a resource (e.g., secondary data store), an expected return model or format for the data from the resource, and one or more processes to perform when the data is obtained, such as to combine the data from the resource with the message data. The secondary data from the resource may be received at the broker as a JSON response. More complex computational tasks may also be performed using the transformation function. For example, an inline function called by the message may result in data being returned from a secondary data source, which may trigger an additional conditional function (e.g., if secondary data matches specified criteria then perform another function). In other words, a message may trigger an expandable transformation rule or transformation function which expands to any number of complex transformation rules or functions.

In another example, a publisher may publish messages to a topic. The SQL query may be performed by the broker inside the service provider environment. If the message is not associated with a transformation rule, then no transformation functions may be performed. If there is no subscriber for the data being published, then no transformation functions may be performed. In yet another example, the service provider may allow customers to create a virtual subscriber when creating transformation rules or functions that will 'listen' for data provided through the service. The transformation rule may be the definition of a topic. When messages are received for the topic, the transformation function may be performed.

Figure 3:
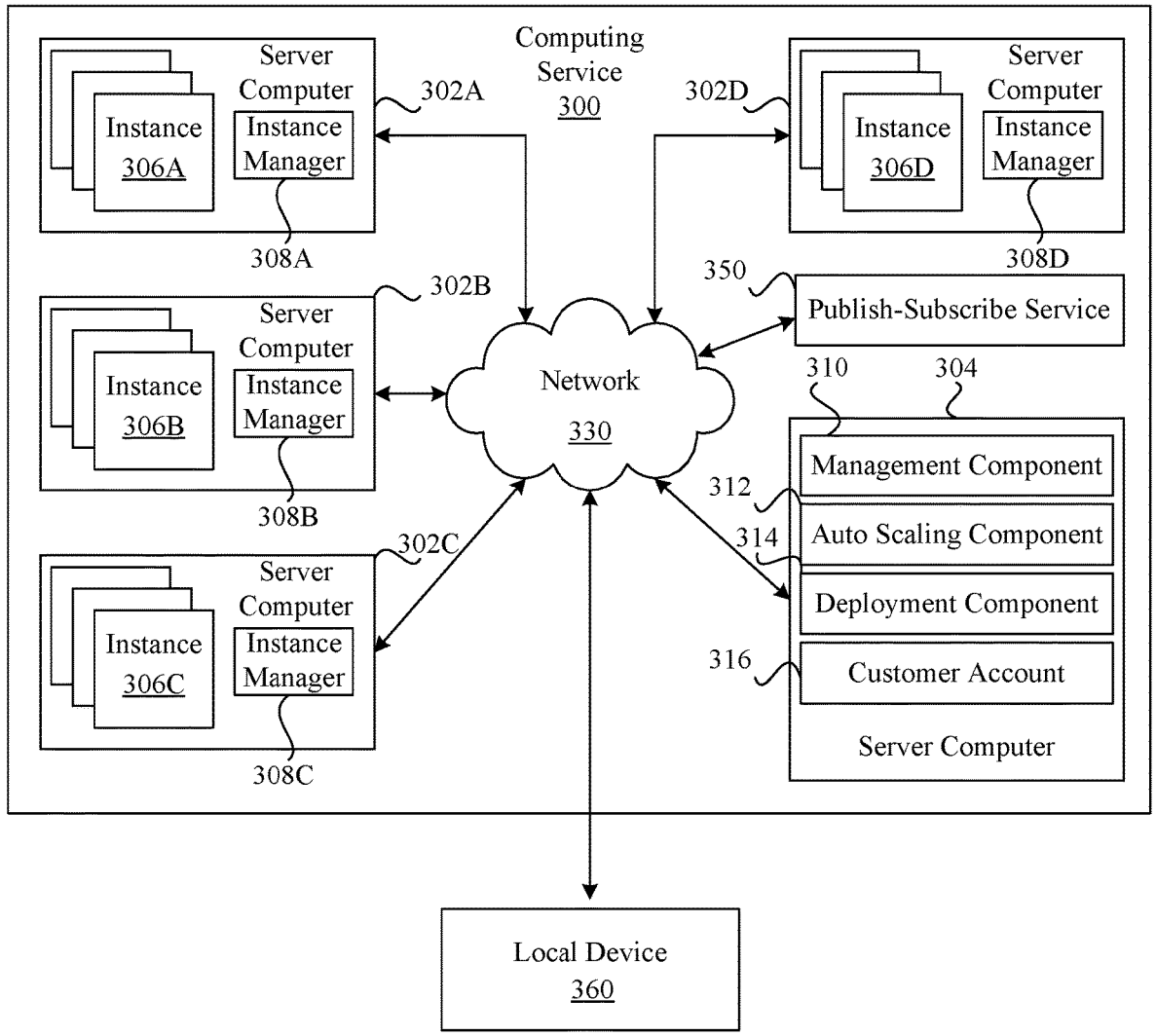
FIG. 3 is a schematic overview of a virtual computing resource service in accordance with an example of the present technology.

The publish-subscribe message transformation technology using the methods or aspects described may be executed or maintained in a data center or service provider environment for a computing service provider. FIG. 3 illustrates how components of a data center may function as a computing service 300 in a service provider environment to provide a platform for computing instances which the present technology may use to execute nodes as described. The computing service 300 (i.e., the cloud provider or service provider) may be capable of delivery of computing and storage capacity as a service to a community of end recipients. In an example implementation, the computing service may be established for an organization by or on behalf of the organization. That is, the computing service 300 may offer a "private cloud environment." In another implementation, the computing service 300 may support a multi-tenant environment, wherein a plurality of customers operate independently (i.e., a public cloud environment). Generally speaking, the computing service 300 can provide the following models: Infrastructure as a Service ("IaaS"), Platform as a Service ("PaaS"), and/or Software as a Service ("SaaS"). Other models may also be provided. In some implementations, end users access the computing service 300 using networked client devices, such as desktop computers, laptops, tablets, smartphones, etc. running web browsers or other lightweight client applications. Those skilled in the art will recognize that the computing service 300 can be described as a "cloud" environment.

The particularly illustrated computing service 300 may include a plurality of server computers 302A-302D. While four server computers are shown, any number may be used, and large centers may include thousands of server computers. The server computers 302A-302D may provide computing resources for executing software instances 306A-306D. In one implementation, the instances 306A-306D may be virtual machines. A virtual machine may be an instance of a software implementation of a machine (i.e. a computer) that executes applications like a physical machine. In the example of virtual machine, each of the servers 302A-302D may be configured to execute an instance manager 308 capable of executing the instances. The instance manager 308 may be a hypervisor or another type of program configured to enable the execution of multiple instances 306 on a single server. Additionally, each of the instances 306 may be configured to execute one or more applications.

It should be appreciated that although the implementations disclosed herein are described primarily in the context of virtual machines, other types of instances can be utilized with the concepts and technologies disclosed herein. For instance, the technologies disclosed herein can be utilized with storage resources, data communications resources, and with other types of computing resources. The implementations disclosed herein might also execute all or a portion of an application directly on a computer system without utilizing virtual machine instances.

One or more server computers 304 may be reserved for executing software components for managing the operation of the server computers 302 and the instances 306. For example, the server computer 304 may execute a management component 310. A customer may access the management component 310 to configure various aspects of the operation of the instances 306 purchased by the customer (i.e., the administrator of a service to be executed using the instances and made available to traffic from client devices). For example, the customer may purchase, rent or lease instances and make changes to the configuration of the instances. The customer may also specify settings regarding how the purchased instances are to be scaled in response to demand. An auto scaling component 312 may scale the instances 306 vertically or horizontally based upon rules defined by the customer. In one implementation, the auto scaling component 312 allows a customer to specify scale-up policies for use in determining when new instances should be instantiated, including what type of instance to instantiate, and scale-down policies for use in determining when existing instances should be terminated. The auto scaling component 312 may consist of a number of subcomponents executing on different server computers 302 or other computing devices. The auto scaling component 312 may monitor available computing resources over an internal management network and modify resources available based on predictions of need as well as based on actual need.

A deployment component 314 may be used to assist customers in the deployment of new instances 306 of computing resources. The deployment component 314 may have access to account information associated with the instances, such as who is the owner of the account, credit card information, country of the owner, etc. The deployment component 314 may receive a configuration from a customer that includes data describing how new instances 306 should be configured. For example, the configuration may specify one or more applications to be installed in new instances 306, provide scripts and/or other types of code to be executed for configuring new instances 306, provide cache logic specifying how an application cache should be prepared, and other types of information. The deployment component 314 may utilize the customer-provided configuration and cache logic to configure, prime, and launch new instances 306. The configuration, cache logic, and other information may be specified by a customer using the management component 310 or by providing this information directly to the deployment component 314.

Customer account information 316 may include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc. Information such as the unique identifier, IP addresses used to access the account and so forth may be used in authenticating a user to the service provider environment.

The computing service 300 may be used to host or provide any number of potential services to customers, such as storage, compute, or other services. In one example, a publish-subscribe service 350 may be provided for managing subscriptions, message receipt, message transformation, message transmission and the like between the server computers 302A-302D, or between devices (e.g., multiple of local device 360) external to the computing service 300 or between a server computer 302A-302D and a device (e.g., local device 360) external to the computing service 300 as has been described. In one example, the publish-subscribe service may be hosted on one or more of the server computers 302A-302D rather than being separate from these server computers 302A-302D as illustrated.

A network 330 may be utilized to interconnect the server computers 302A-302D and the server computer 304. The network 330 may be a local area network (LAN) and may be connected to a Wide Area Network (WAN) so that end users may access the computing service 300. It should be appreciated that the network topology illustrated in FIG. 3 has been simplified and that many more networks and networking devices may be utilized to interconnect the various computing systems disclosed herein.

Figure 4:
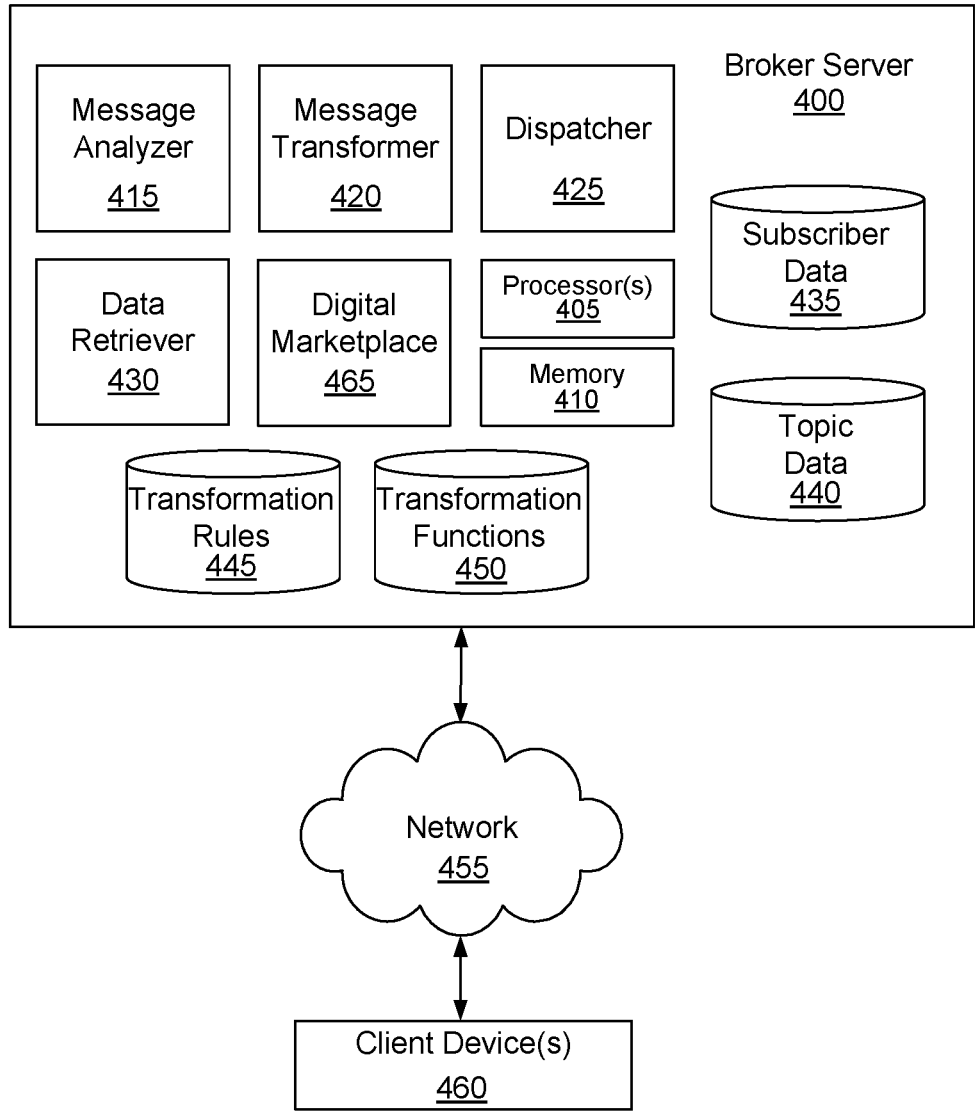
FIG. 4 is a block diagram of a system for managing publish-subscribe messages, publications and subscriptions in accordance with an example of the present technology.

Referring now to FIG. 4, a block diagram of a system in a service provider environment for managing publish-subscribe message transformations is illustrated in accordance with an example of the present technology. The system elements may be implemented using one or more computing devices in a service provider environment, such as a broker server 400 or broker service as an example computing device, as well as client devices 460 which may be external to the service provider environment, and may be implemented across a network 455.

The system may include one or more data stores 435-450 and a number of modules or services 415-430, 465 as part of a publish-subscribe message transformation service for transforming messages published by publishers and received by the broker server 400 prior to republishing to subscribers. Client device 460 may represent a plurality of client devices comprising the publisher(s) and subscriber(s), where messages are transmitted over the network 455.

Computing services offered by a service provider environment, may include a computing device (e.g., a droplet) that executes one or more servers or computing instances on the computing device. One or more servers (e.g. a computing instance operating as a server) may be operated to execute an operating system and implement a communications application which is scalable and asynchronous. A user may create, launch, and terminate servers as desired. The user may have some control over the geographical location of servers or clusters of servers to optimize latency and provide high levels of redundancy.

The broker server(s) 400 may be a virtual computing instance as previously explained, and the virtual computing instance may be implemented using a virtualization computing environment in a service provider environment, which may include a virtual distributed computing system with a virtualization layer executing on a hardware substrate layer. The hardware layer may include a plurality of physical computers, servers or processing nodes. The virtualization layer (e.g., hypervisors and virtualization control plane) may provide platforms on which virtual computing instances may be created. In other words, the virtual computing instances may execute on the hardware layer by using the platform provided by the virtualization layer. This computing service architecture that supports computing instances is illustrated in more detail in FIG. 4.

The broker server 400 may be configured to receive messages from a publisher. Upon receipt of a message, the broker server 400 may queue the message for delivery to a subscriber. The broker server 400 may maintain a data store of subscriber data 435 identifying subscribers and a data store of topic data 440 identifying topics to which a subscriber may subscribe or to which a publisher has published or may publish one or more messages. The broker server 400 may identify a topic in a message, either explicitly identified in the message, implicitly determinable based on the message data, or based on the publisher. If the topic in the message corresponds to a topic in the topic data store 440 then subscribers having subscribed to the topic may be queued to receive the message. In one example, the subscriber data store 435 and the topic data store 440 may comprise a single data store managing the relationships of subscribers and topics. The broker server 400 may store or manage publisher data and/or authentication data for authenticating publishers or subscribers as well. In this example, the subscriber data store 435 may operate as a subscription data store to manager aspects of the subscription in addition to those pertaining specifically to subscribers.

The message from a publisher may include a tuple defining message data, a transformation flag indicating whether the message is to be transformed, a publisher identifier, or any other suitable information or information fields. The message analyzer 415 may determine whether the message is associated with a transformation rule from the transformation rules data store 445 for transforming the message. The message analyzer 415 may also determine whether a message matches or is associated with a specific topic in the topic data store 440 and/or one or more subscriptions in the subscriber data store 435.

The message transformer 420 may transform the message into a transformed message based on a result from the message analyzer. For example the message transformer may use one or more transformation functions in the transformation functions data store 450 to transform the message according to the function(s). The message transformer may optionally utilizer a data retriever 430 to retrieve secondary data from a secondary data source (130, FIG. 1A) when the transformation rule identifies instructions for inclusion of the secondary data in the transformed message. The dispatcher 425 may transmit or publish the transformed message from the broker server 400 to the subscriber(s).

The system may include a digital marketplace 465 for receiving a subscription to the topic from the subscriber. The digital marketplace 465 may facilitate the identification of the transformation rule. For example, the digital marketplace 465 may provide an interface through which a subscriber may define transformation rules or functions, or select from and purchase pre-defined rules or functions defined by publishers, service providers, third-parties or the like. The interface provided by the digital marketplace 465 may also be used to create, cancel or otherwise manage subscriptions and payment information. For example, the digital marketplace may enable customers or subscribers to pay for a number of transformation rules executed, retrieval of the secondary data, a number of messages transmitted, or the like as has been described.

Client devices 460 may be available to access and interact with the server 400 in a computing service provider environment or one or more computing instances or clusters, over a network 455. Example client devices 460 may include, but are not limited to, a desktop computer, a laptop, a tablet, a mobile device, a television, a cell phone, a smart phone, a hand held messaging device, a personal data assistant, an electronic book reader, heads up display (HUD) glasses or any device with a display that may receive and present the message content.

The service provider environment may be implemented across one or more computing device(s) connected via a network 455. For example, a computing device may include a data store and various engines and/or modules such as those described above and such modules may be executable by a processor 405 of the computing device. The system may be implemented as a plurality of computing nodes or computing instances, each of which comprises at least one processor 405 and a memory 410, where the computing nodes are configured to collectively implement the modules, data stores and so forth.

The modules that have been described may be stored on, accessed by, accessed through, or executed by a computing device. The computing device may comprise, for example, one or more processors 405 and one or more memory modules 410. The computing device may comprise, for example, a server computer or any other system providing computing capability. Alternatively, a plurality of computing devices may be employed that are arranged, for example, in one or more server banks, blade servers or other arrangements. For example, a plurality of computing devices together may comprise a clustered computing resource, a grid computing resource, and/or any other distributed computing arrangement. Such computing devices may be located in a single installation or may be distributed among many different geographical locations. For purposes of convenience, the computing device is referred to herein in the singular form. Even though the computing device is referred to in the singular form, however, it is understood that a plurality of computing devices may be employed in the various arrangements described above.

Various applications and/or other functionality may be executed in the computing device according to various implementations, which applications and/or functionality may be represented at least in part by the modules that have been described. Also, various data may be stored in a data store that is accessible to the computing device. The data store may be representative of a plurality of data stores as may be appreciated. The data stored in the data store, for example, may be associated with the operation of the various modules, applications and/or functional entities described. The components executed on the computing device may include the modules described, as well as various other applications, services, processes, systems, engines or functionality not discussed in detail herein.

The client device shown in FIG. 4 may be representative of a plurality of client devices 460 that may be coupled to the network 455. The client device(s) 460 may communicate with the computing device over any appropriate network, including an intranet, the Internet, a cellular network, a local area network (LAN), a wide area network (WAN), a wireless data network or a similar network or combination of networks. In one example, the network 455 may be the communications network of the present technology.

Although a specific structure may be described herein that defines server-side roles (e.g., of content delivery service) and client-side roles (e.g., of the content access application), it is understood that various functions may be performed at the server side or the client side.

Certain processing modules may be discussed in connection with this technology. In one example configuration, a module may be considered a service with one or more processes executing on a server or other computer hardware. Such services may be centrally hosted functionality or a service application that may receive requests and provide output to other services or customer devices. For example, modules providing services may be considered on-demand computing that is hosted in a server, cloud, grid or cluster computing system. An application program interface (API) may be provided for each module to enable a second module to send requests to and receive output from the first module. Such APIs may also allow third parties to interface with the module and make requests and receive output from the modules.

Figure 5:
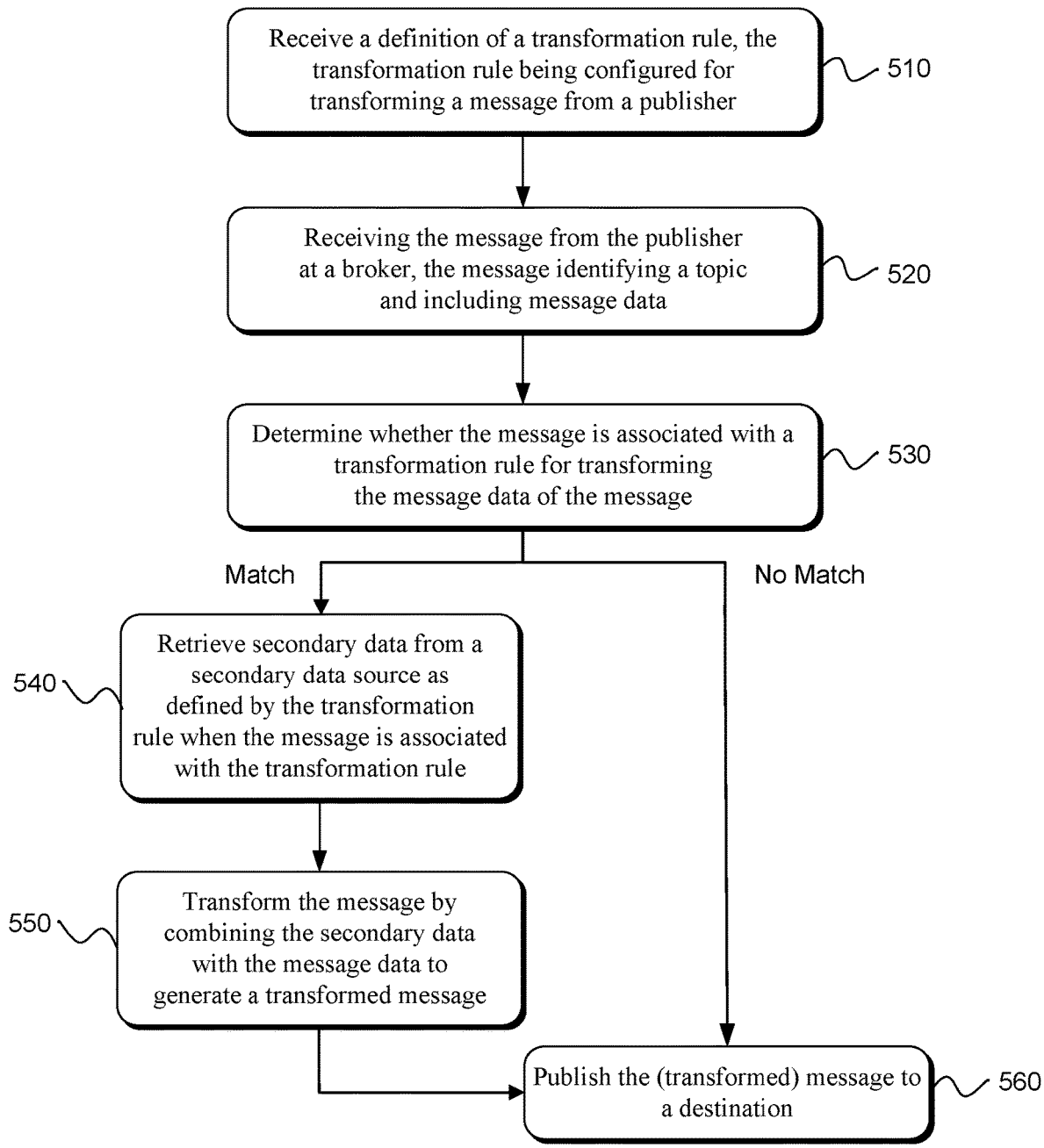
FIGS. 5-6 are flow diagrams for publish-subscribe messaging methods in accordance with examples of the present technology.
Figure 6:
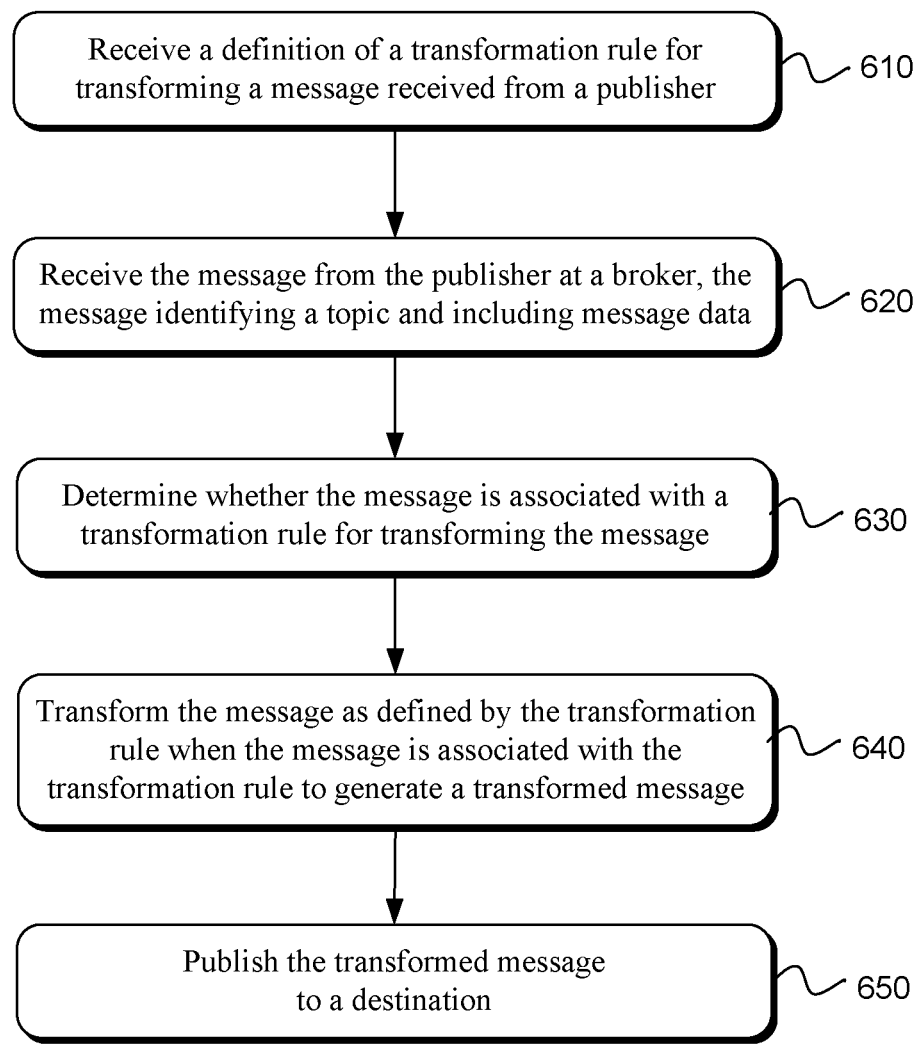

FIGS. 5-6 illustrate flow diagrams of methods according to the present technology. For simplicity of explanation, the method is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Any of a variety of other process implementations which would occur to one of ordinary skill in the art, including but not limited to variations or modifications to the process implementations described herein, are also considered to be within the scope of this disclosure.

Referring now to FIG. 5, a flow diagram of a method is illustrated for a publish-subscribe messaging method. The method may include receiving 510 a definition of a transformation rule configured for transforming a message from a publisher. A message may be received 520 from the publisher at a broker. The message may identify a topic and include message data. A determination 530 may be made as to whether the message is associated with a transformation rule for transforming the message data of the message. For example, a message associated with predefined criteria defined in the transformation rule may be transformed using a transformation function at the broker. In one example, secondary data may be retrieved 540 from a secondary data source as defined by the transformation rule. The function may be used to transform 550 the message by combining the secondary data with the message data and generate a transformed message. The transformed message may be published 560 to the subscriber subscribing to the topic identified in the message.

In one example, retrieving the secondary data from the secondary data source is performed when the topic of the message is associated with the transformation rule. In other words, the transformation rule may define that the transformation function be performed when a message of a particular topic is received. In a more specific example, retrieving the secondary data from the secondary data source is performed when both the topic and the message data of the message is associated with the transformation rule. For example, topics of received messages may be identified.

When the topic is associated with the transformation rule then the message may be further analyzed to determine whether content of the message (i.e., in the message data) is also associated with the transformation rule. The transformation function may be performed after determining that both the topic and the message data are associated with the transformation rule. In yet another example, the secondary data may be retrieved when the message is associated with the transformation rule, regardless of whether the topic is associated with the transformation rule. The message may optionally include a flag indicating that a transformation rule is to be applied. The message data may optionally include the transformation function as an inline function within the message. In this example, the transformation rule may be used to identify the presence of the inline function. The transformation rule may define retrieval of the secondary data from the secondary data source identified in the inline function. In other words, the transformation rule may define the secondary data source as defined by the inline function.

The publisher and/or the subscriber may be IoT devices. For example, the publisher may be an IoT device that includes a sensor or transducer for generating data which is used as the message data. In another example, the secondary data may include data generated by a sensor. As an implementation example, the publisher may publish location data of a physical asset. Secondary data may be a weather or temperature monitor. The secondary data source may be a secondary publisher. The transformation rule may define that when a location of the physical asset changes, to perform the transformation function. The transformation function may combine the location and temperature data, optionally as a function of time, to transform the message to the transformed message before the transformed message is transmitted to a subscriber. The subscriber may be a single subscriber or may include any number of subscribers. The subscriber may be an entity responsible for tracking the physical asset and may make a record of the received messages in order to provide reports, alerts or the like based on the location and temperature data.

In one example, the method may include sending the message as received from the publisher when the message is not associated with a transformation rule. For example, a transform flag may not be set in the message, and the transformation rule may test for whether the flag is set. The flag may be set by the publisher. If the flag is not set, the message data may be sent to the subscriber without transformation.

In one example, the message is received from the publisher at a service. The service may be a broker service for managing the publication of messages to the subscribers. The service may include a server clock. The service may transform or update the message data to include the current time using the server clock as the data source according to applicable transformation rules or functions. In another example, the secondary data source may be a secondary publisher. The secondary data source may be external to the service. The secondary data source may be external to a service provider environment hosting the service.

In some examples, this or other methods described herein may be implemented wholly or partially as computer readable program code executed by a processor and the computer readable code may be embodied on a non-transitory computer usable medium.

Referring now to FIG. 6, a flow diagram of a method is illustrated for publish-subscribe message transformations. In this example, the publish-subscribe messaging method may include receiving 610 a definition of a transformation rule for transforming a message received from a publisher. The message may be received 620 from the publisher at a broker. The message may identify a topic and may include message data. A determination 630 may be made as to whether the message is associated with a transformation rule for transforming the message. The method may further include transforming 640 the message as defined by the transformation rule and publishing 650 the transformed message to a subscriber subscribing to the topic.

The method may include receiving the definition of the transformation rule from the subscriber. Alternatively, the method may include receiving selection of the transformation rule from the subscriber after receiving the definition, such as from another source. A service provider may provide a marketplace for transformation rules and/or functions, in addition to data to be used with the transformation. Thus, the definition may be provided by the service provider. In another example, third parties may provide the definitions from which subscribers may select a desired definition. The transformation rule may include or define the transformation function to be executed on the message. The method may be performed in the marketplace and incur an expense or cost to the subscriber when the function is executed. For example, a the cost may depend on the complexity of the function or the quantity of secondary data retrieved, or the number of sources from which secondary data is retrieved, and so forth.

In one example, the message data includes geolocation data. The transformation rule may be executed on the message when the geolocation data indicates a geolocation outside of a predefined geofence. In other words, the transformation rule may call a function to be executed when the geolocation data is outside of the predefined geofence as defined in the transformation rule. The message data may include geolocation data and the transformation rule may define inclusion of secondary data to combine with the geolocation data for generating the transformed message.

The method may include retrieving secondary data from a secondary data source as defined by the transformation rule when the message is associated with the transformation rule. The secondary source may include multiple secondary data sources and the method may include retrieving the secondary data from each of the secondary data sources. The transformation function may combine or manipulate the data from these sources to create the transformed message for transmission to the subscriber. Each of the secondary data sources may respectively provide different data than other of the secondary data sources.

The method may include transforming the message when the transformation rule identifies an inline function in the message to use in transforming the message. The method may include determining that the message data satisfies a predefined condition and transforming the message when the transformation rule identifies a function to execute on the message based on the predefined condition.

The message data, or the transformed message data, may include any of a variety of suitable data types. For example, the message data may include any one or more of text (e.g., alphanumeric characters), an image, a video, audio, time, temperature, speed, location, or any of a number of other types not listed but which would be apparent to one of skill in the art and which are considered to be within the scope of this disclosure.

In one example, the method may include determining whether a flag is set for the message to be transformed. When the flag is not set, the message may be published as received from the publisher without transforming the message data. The flag may be set or not set, such as by the inclusion of one or more characters or strings that identifies a 'set' state and/or one or more characters or strings that identifies a not set' state. In one example, presence and absence of a character or string in a flag field of a tuple in the message data may indicate the set or not set states. In one example, when the flag field is empty then the flag is not set.

The secondary data source may be a third party data source. For example, the data source may belong to or be managed by the publisher or some other third party. The data source may optionally be external to a service provider environment in which the method is performed. For example, the data source may be a global positioning system (GPS) device, a camera, a thermometer or the like.

In one example, the message may be published by transmitting the transformed message to the subscriber via a transmission control protocol (TCP). However, other types of transmission protocols which are not listed here are also contemplated.

Figure 7:
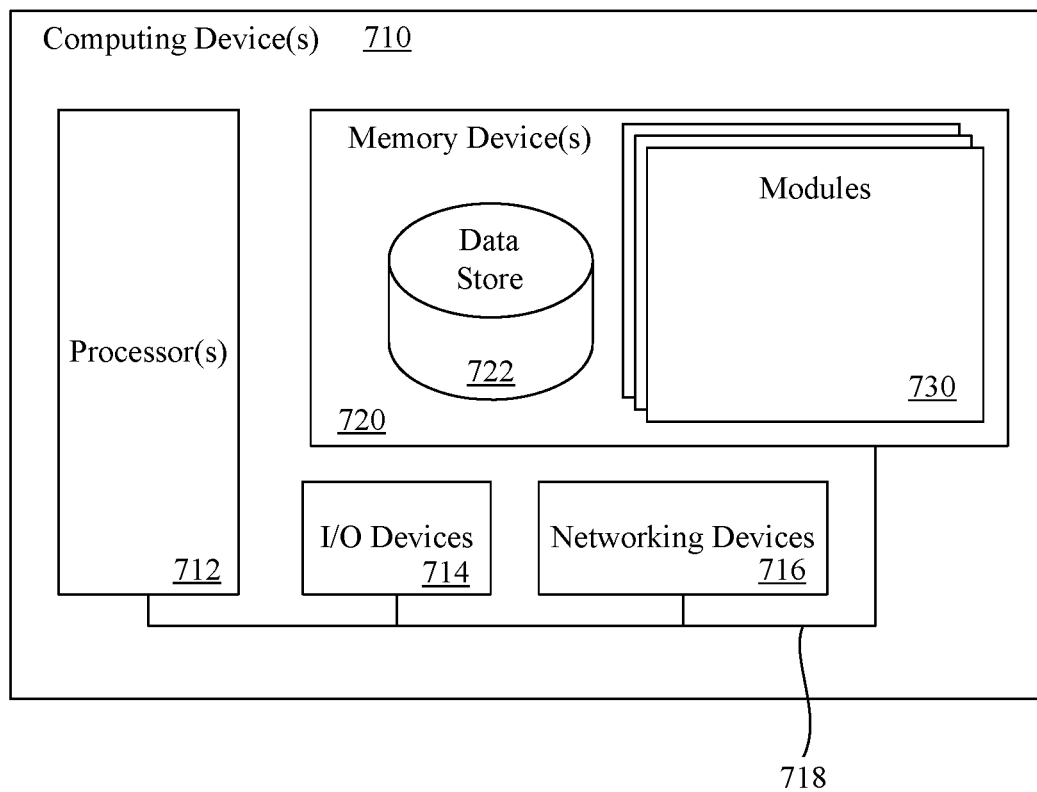
FIG. 7 is a block diagram of a computing system for use in managing publish-subscribe message transformations in accordance with an example of the present technology.

FIG. 7 illustrates a computing device 710 on which services or modules of this technology may execute. A computing device 710 is illustrated on which a high level example of the technology may be executed. The computing device 710 may include one or more processors 712 that are in communication with memory devices 720. The computing device 710 may include a local communication interface 718 for the components in the computing device. For example, the local communication interface 718 may be a local data bus and/or any related address or control busses as may be desired.

The memory device 720 may contain modules 730 that are executable by the processor(s) and data for the modules. A data store 722 may also be located in the memory device 720 for storing data related to the modules and other applications along with an operating system that is executable by the processor(s) 712.

The computing device 710 may further include or be in communication with a client device, which may include a display device. The client device may be available for an administrator to use in interfacing with the computing device 710, such as to review operation of a virtual computing instance, make improvements to machine learning models and so forth.

Various applications may be stored in the memory device 720 and may be executable by the processor(s) 712. Components or modules discussed in this description that may be implemented in the form of software using high programming level languages that are compiled, interpreted or executed using a hybrid of the methods.

The computing device 710 may also have access to I/O (input/output) devices 714 that are usable by the computing devices. An example of an I/O device 714 is a display screen that is available to display output from the computing devices. Other known I/O device may be used with the computing device as desired. Networking devices 716 and similar communication devices may be included in the computing device 710. The networking devices 716 may be wired or wireless networking devices 716 that connect to the internet, a LAN, WAN, or other computing network.

The components or modules that are shown as being stored in the memory device 720 may be executed by the processor 712. The term "executable" may mean a program file that is in a form that may be executed by a processor 712. For example, a program in a higher level language may be compiled into machine code in a format that may be loaded into a random access portion of the memory device 720 and executed by the processor 712, or source code may be loaded by another executable program and interpreted to generate instructions in a random access portion of the memory to be executed by a processor 712. The executable program may be stored in any portion or component of the memory device 720. For example, the memory device 720 may be random access memory (RAM), read only memory (ROM), flash memory, a solid state drive, memory card, a hard drive, optical disk, floppy disk, magnetic tape, or any other memory components.

The processor 712 may represent multiple processors and the memory 720 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. The computer readable storage medium may, for example, be in the form of a non-transitory computer readable storage medium. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

It is noted that any of the distributed system implementations described above, or any of their components, may be implemented as one or more web services. In some implementations, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various implementations, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some implementations, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A non-transitory computer-readable storage medium storing thereon computer-executable instructions that, as a result of being executed by one or more processors of a computer system, cause the computer system to at least:
   receive a definition of a transformation rule, the transformation rule to transform a message when transformation criteria is satisfied, the transformation rule to identify an inline function in the message, the inline function identifying a secondary data source of a third party and defining a transformation for the message, the transformation criteria requiring that a specified publisher is a source of the message, wherein the secondary data source comprises a plurality of secondary data sources;
   receive a first message at a broker, the first message identifying a topic an including message data;
   determine, at least in part by the broker, that the first message is associated with the transformation rule to transform the message data of the first message based on the inline function;
   as a result of the transformation criteria being satisfied and a determination that the first message is associated with the transformation rule, retrieve, at least in part by the broker, secondary data from each of the plurality of secondary data source as defined by the transformation rule, the secondary data including a different type of data than the message data, and each secondary data source of the plurality of secondary data sources provides different data from another secondary data source of the plurality of secondary data sources;
   transform, at least in part by the broker, the first message using the inline function and the secondary data according to the transformation rule to generate a transformed second message; and
   publish the transformed second message to a destination.

2. The non-transitory computer-readable storage medium of claim 1, wherein the transformation criteria identifies a predetermined topic and retrieving the secondary data from the secondary data source is performed when the topic of the first message corresponds to the predetermined topic.

3. The non-transitory computer-readable storage medium of claim 1, wherein the transformation criteria identifies a predetermined topic and specifies message content, and retrieving the secondary data is performed when the topic of the first message corresponds to the predetermined topic and the message data of the first message includes the message content.

4. The non-transitory computer-readable storage medium of claim 1, wherein transforming the first message comprises incorporating at least a portion of the secondary data into the first message.

5. A computer-implemented method, comprising:
obtaining a transformation rule to transform a message received from a publisher, the transformation rule defining transformation criteria and including a check for an inline function in the message, the inline function identifying a secondary data source of a third party and defining an additional transformation of the message, the transformation criteria requiring that the publisher is a source of the message, wherein the secondary data source comprises a plurality of secondary data sources;
receiving a first message at a broker, the first message identifying a topic and including message data;
determining whether the first message contains the inline function and satisfies the transformation criteria;
when the first message is determined to contain the inline function and to satisfy the transformation criteria, obtaining, at the broker, secondary data from each of the plurality of secondary data sources and transforming, by the broker, the first message according to the transformation rule using the inline function and the plurality of secondary data sources to generate a transformed second message, wherein transforming the first message comprises retrieving secondary data from the plurality of secondary data sources, and incorporating the secondary data into the first message; and
sending the transformed second message to a destination.

6. The computer-implemented method of claim 5, further comprising receiving a definition of the transformation rule from a subscriber or receiving selection of the transformation rule from the subscriber after receiving the definition of the transformation rule, wherein the subscriber subscribing to the topic is the destination.

7. The computer-implemented method of claim 5, wherein the message data includes geolocation data and the transformation rule is executed on the first message when the geolocation data indicates a geolocation that does not conform to a predefined geofence.

8. The computer-implemented method of claim 5, wherein the message data includes geolocation data and the transformation rule defines inclusion of secondary data to combine with the geolocation data for generating the transformed second message.

9. The computer-implemented method of claim 5, wherein each of the plurality of secondary data sources provides different data from others of the plurality of secondary data sources.

10. The computer-implemented method of claim 5, wherein the transformation criteria requires that a message topic correspond to a predefined topic.

11. The computer-implemented method of claim 10, wherein the transformation criteria requires that the message include particular message data.

12. The computer-implemented method of claim 5, wherein the transformation rule identifies a function to be executed with respect to the first message, the method further comprising incurring an expense to a subscriber when the function is executed.

13. The computer-implemented method of claim 5, wherein the publisher and the destination have disparate manufacturers and communicate using at least one of different protocols, different data form at or different languages, and transforming the first message allows the destination to use the transformed second message.

14. The computer-implemented method of claim 5, wherein the transformation criteria specifies at least one of a particular message content or a message flag that is included in the message.

15. The computer-implemented method of claim 5, wherein the secondary data is obtained from a first secondary data source and a second secondary data source of the plurality of secondary data sources.

16. The computer-implemented method of claim 15, wherein the transformed second message includes data from the first secondary data source and the second secondary data source of the plurality of secondary data sources.

17. The computer-implemented method of claim 5, wherein the destination includes a plurality of different endpoints.

18. A computing system comprising:
one or more processors; and
memory storing computer-executable instructions that, if executed, cause the one or more processors to:
identify a transformation rule to transform a message when transformation criteria is satisfied, the transformation rule including a check for an inline function in the message, the inline function defining a transformation for the message and identifying a secondary data source of a third party, the transformation criteria requiring that a specified publisher is a source of the message, wherein the secondary data source comprises a plurality of secondary data sources;
receive, at a broker, a first message identifying a topic and including message data and the inline function;
as a result of a determination that the transformation criteria is satisfied and that the first message is associated with the transformation rule retrieve secondary data from each of the plurality of secondary data sources as defined by the transformation rule, the secondary data including a different type of data than the message data, and each data source of the plurality of secondary data sources provides different data from another data source of the plurality of secondary data sources;
transform, using the inline function included in the first message and the secondary data, the first message into a transformed second message;
store the transformed second message at a digital marketplace to enable a subscriber to purchase the transformed second message; and
transmit the transformed second message to a destination.

19. The computing system of claim 18, wherein the digital marketplace facilitates payment by the subscriber for at least one of a number of transformation rules executed, retrieval of the secondary data, or a number of messages transmitted.

20. The computing system of claim 18, wherein the secondary data source includes a transducer.

21. The computing system of claim 18, wherein the secondary data source includes a second publisher.

\* \* \* \* \*